Sept. 22, 1936.                T. TARISIEN                 2,055,112
                          SPEED CONTROLLED BRAKE
                            Filed Jan. 8, 1935
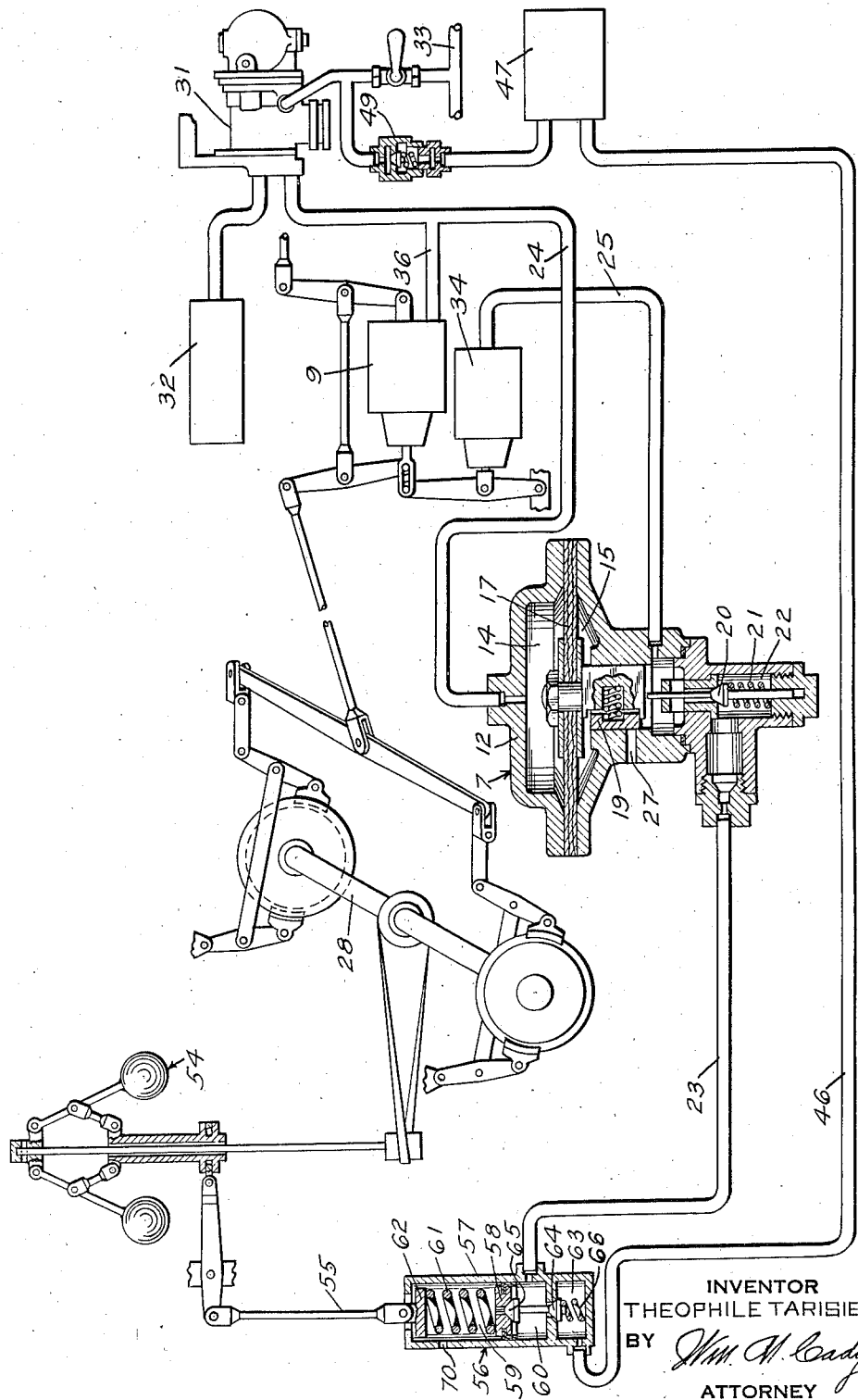
INVENTOR
THEOPHILE TARISIEN
BY
ATTORNEY Patented Sept. 22, 1936

2,055,112

UNITED STATES PATENT OFFICE 2,055,112

SPEED CONTROLLED BRAKE

Theophile Tarisien, Livry-Gargan, France, assignor to The Westinghouse Air Brake Company, Wilmerding, Pa., a corporation of Pennsylvania Application January 8, 1935, Serial No. 810
In France May 1, 1934

12 Claims. (Cl. 303—21)

This invention relates to fluid pressure braking apparatus for railway or other vehicles of the kind in which the pressure obtaining in a brake cylinder during an application of the brakes is arranged to be automatically adjusted in accordance with the speed of the vehicle, in such a manner that when an application of the brakes is effected the supply of fluid under pressure to the brake cylinder is automatically cut off as soon as a brake cylinder pressure is established corresponding to the maximum tangential effort that may be exerted upon the vehicle wheels by the brake blocks without causing locking of the wheels at the speed of rotation of the wheels at the time of application, the supply of fluid under pressure to the brake cylinder being renewed in the event of a subsequent increase in the speed of rotation, while the brake cylinder pressure is automatically reduced as the speed of rotation decreases.

This control of the braking effort exerted is furthermore arranged to be effected without interfering with the application or release of the brakes to an extent less than that required to produce the maximum retardation above referred to, so that the driver of the vehicle is enabled to retain full control of the braking action while enabling the maximum retardation to be obtained without the possibility of locking the wheels of the vehicle.

According to the principal feature, a centrifugal device of the ball governor type driven from an axle of the vehicle, is arranged to cooperate with a pressure regulator to maintain a fluid pressure which is dependent upon the speed of rotation of the axle and which is utilized to control the pressure obtaining in a brake cylinder of the vehicle during an application of the brakes.

In the accompanying drawing, the invention is illustrated by way of example as applied to a brake equipment comprising a triple valve device 31 associated with an auxiliary reservoir 32 and operated in accordance with the pressure conditions obtaining in a brake pipe 33. The ordinary or primary brake cylinder 9 is coupled to the brake rigging to which an auxiliary brake cylinder 34 is also coupled as shown in the drawing, the supply of fluid to and its release from the auxiliary brake cylinder 34 being controlled by a regulating valve device 7.

The regulating valve device 7 comprises a casing 12 subdivided internally into two chambers 14 and 15 by a flexible diaphragm 17 which is adapted to operate a slide valve 19 contained in the chamber 15. The lower part of the casing 12 contains a supply valve 20 of the poppet type provided with a controlling spring 21, the valve 20 controlling communication between a supply chamber 22 and the chamber 15.

The seat of the slide valve 19 is provided with an exhaust port 27 adapted when uncovered by the slide valve 19 to establish communication between the chamber 15 and the atmosphere.

A centrifugal device 54 of the ball governor type is adapted to be driven from an axle 28 of the vehicle as shown in the drawing, and is arranged as the speed of rotation of the axle 28 increases to exert a downward thrust upon a rod 55 of a pressure regulating valve device 56 which comprises a cylindrical casing 57 containing a movable piston 58. The piston 58 divides the casing 57 into upper and lower compartments or chambers 59 and 60 and a compression spring 61 in the compartment 59 is interposed between the piston 58 and a plunger 62 connected to the rod 55. The lower part of the casing 57 has a chamber 63 and communication between the chamber 63 and the compartment 60 is controlled by an inlet valve 64 which is connected to an outlet valve 65 controlling communication between the compartments 60 and 59.

The compartment 59 is open to the atmosphere through a passage 70, and the compartment 60 communicates through a pipe 23 with the supply chamber 22 of the regulating valve device 7, while the chamber 63 communicates through a pipe 46 with a supplementary reservoir 47.

The operation of the apparatus is as follows:

Under running conditions, the supplementary reservoir 47 is charged with fluid from the brake pipe 33 through a non-return valve 49.

With the triple valve device 31 in the usual release position, the brake cylinder 9 is vented to the atmosphere through pipes 36 and 24. Chamber 14 of the regulating valve device 7 is also vented to the atmosphere through pipe 24, and the brake cylinder 34 and chamber 15 of the regulating valve device 7 are vented to the atmosphere through the exhaust port 27.

As shown in the drawing, the slide valve 19 is lapping passage 27, but in releasing the brakes after an application, which will hereinafter be described, when fluid under pressure is vented from chamber 14 by the operation of the triple valve device 31, the pressure of fluid in chamber 15 deflects the diaphragm 17 upwardly, which shifts the slide valve 19 so as to uncover passage 27 to permit the release of fluid under pressure from chamber 15 and brake cylinder 34. The device 7 remains in this position, in case chamber 14 is completely vented, until the fluid pressure in chamber 15 is reduced to some low degree, such as one quarter of one pound, at which time the internal stresses set up in the diaphragm, upon deflection, returns said diaphragm to its normal position, as shown in the drawing. This movement of the diaphragm shifts the slide valve 19 so as to lap passage 27, but it will be noted that passage 27 is not lapped until after the brake cylinder 34 is substantially completely vented and therefore the brakes completely released.

So long as the vehicle is at rest, the rod 55 does not exert any downward pressure upon the plunger 62 and spring 61, with the result that the piston 58 will be merely resting on the valve 65 and the inlet valve 64 will be closed under the action of a light controlling spring 66. Under this condition the compartment 60 of the pressure regulating valve device 56 and the supply chamber 22 of the regulating valve device 7 will be at substantially atmospheric pressure since any pressure acting in said compartment will tend to lift the piston 58 away from the valve 65 and be dissipated past said valve and to the atmosphere through passage 70.

When the vehicle is in motion, the action of the centrifugal device 54 causes a downward thrust, proportional to the speed of rotation of the axle 28 and, therefore, proportional to the speed of the vehicle, to be exerted upon the rod 55, and this thrust transmitted through the plunger 62 correspondingly compresses the spring 61. As a result, the piston 58 is moved downwardly and acts through the outlet valve 65 to open the inlet valve 64. Fluid from the reservoir 47 is thereupon supplied through the pipe 46, chamber 63, past the open valve 64 to the compartment 60 and thence through pipe 23 to the supply chamber 22 of the regulating valve device 7. As soon as the pressure thus established in the compartment 60 overcomes the opposing pressure of the spring 61, the piston 58 is moved upwardly to permit the valve 64 to close without, however, opening the valve 65. In the event of the speed of the vehicle being reduced, the compression of the spring 61 is correspondingly reduced and the piston 58 moves upwardly to permit opening of the valve 65 and permit the release of fluid from the supply chamber 22 to the atmosphere by way of pipe 23, compartment 60, valve 65, compartment 59, and passage 70.

It will thus be seen that the action of the pressure regulating valve device 56 maintains a pressure in the supply chamber 22 of the regulating valve device 7, which is at all times proportional to the speed of the vehicle.

When an application of the brakes on the vehicle is effected in the usual manner by manual operation of a brake valve device (not shown) to effect a reduction of the pressure in the brake pipe 33, fluid under pressure is supplied to the ordinary brake cylinder 9 from the auxiliary reservoir 32 through the triple valve device 31. The pressure thus established in the brake cylinder 9 is transmitted through the pipe 24 to the chamber 14 of the regulating valve device 7, and the diaphragm 17 is consequently deflected downwardly to open the supply valve 20.

Fluid under pressure from the chamber 22 is consequently permitted to flow past the valve 20 to chamber 15 and from thence through pipe 25 to the auxiliary brake cylinder 34, until the pressure thus obtained in said brake cylinder corresponds to that supplied by the pressure regulating valve device 56, which is speed regulated. In case the speed of the vehicle reduces, the resultant action of the pressure regulating valve device 56 to reduce the pressure in chamber 22 will cause a corresponding reduction in the brake cylinder 34, while in case the speed of the vehicle increases, the resultant operation of the pressure regulating valve device 56 to increase the pressure in chamber 22 will cause a corresponding increase in pressure in the brake cylinder 34.

If the degree of application of brakes is less than the maximum permissible according to speed, then when the pressure obtained in brake cylinder 34 and chamber 15 of the regulating valve device 7 becomes substantially equal to that in chamber 14 as supplied from the ordinary brake cylinder 9, the diaphragm 17 will be moved upwardly, whereupon spring 21 will seat valve 20 and thus cut off further flow of fluid under pressure to the brake cylinder 34.

It will thus be seen that the pressure established in the auxiliary brake cylinder 34 depends upon the pressure obtained in the ordinary brake cylinder 9 when the degree of application is less than the maximum permitted according to speed, while in case the brakes are applied with maximum force, the pressure obtained in brake cylinder 34 is controlled by the adjustment of the pressure regulating valve device 56, this latter pressure being dependent upon the speed of the vehicle.

The braking effort obtained will evidently be due to the sum of the braking efforts of the brake cylinders 9 and 34, and while the pressure in the brake cylinder 9 is under the direct control of the driver, the pressure in the brake cylinder 34 is dependent upon the braking effort exerted by the brake cylinder 9 and upon the speed of the vehicle.

The maximum braking effort thus corresponds to that due to the action of the driver as modified by the speed of the vehicle at the time and can thus under all conditions be arranged to effect the most effective retardation of the vehicle without risk of skidding the wheels of the vehicle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a primary brake cylinder, an auxiliary brake cylinder, and valve means operative to supply fluid under pressure to said primary brake cylinder, speed controlled means for supplying fluid under pressure to said auxiliary brake cylinder at a pressure which varies according to the speed of the vehicle, and means for controlling the communication through which fluid under pressure is supplied to said auxiliary brake cylinder and operative upon an increase in pressure in said primary brake cylinder to open said communication.

2. In a fluid pressure brake, the combination with a primary brake cylinder, an auxiliary brake cylinder, and valve means operative to supply fluid under pressure to said primary brake cylinder, speed controlled means for supplying fluid under pressure to said auxiliary brake cylinder at a pressure which varies according to the speed of the vehicle, and means controlled by the opposing pressures of said brake cylinders and operative upon an increase in pressure in said primary brake cylinder to open communication through which fluid under pressure is adapted to be supplied from said speed controlled means to said auxiliary brake cylinder, and operative upon substantial equalization of pressures in both brake cylinders to close said communication.

3. In a fluid pressure brake, the combination with a primary brake cylinder, an auxiliary brake cylinder, and valve means operative to supply fluid under pressure to said primary brake cylinder, speed controlled means for varying the pressure in a chamber according to the speed of the vehicle, and means operative upon supplying fluid under pressure to said primary brake cylinder to establish communication from said auxiliary brake cylinder to said chamber whereby fluid at the pressure in said chamber is supplied to said auxiliary brake cylinder.

4. In a fluid pressure brake, the combination with a primary brake cylinder, an auxiliary brake cylinder, and valve means operative to supply fluid under pressure to said primary brake cylinder, speed controlled means for varying the pressure in a chamber according to the speed of the vehicle, and means operative upon supplying fluid under pressure to said primary brake cylinder to establish communication from said auxiliary brake cylinder to said chamber whereby fluid at the pressure in said chamber is supplied to said auxiliary brake cylinder, said means being operative upon a reduction in pressure in said primary brake cylinder to vent fluid under pressure from said auxiliary brake cylinder.

5. In a fluid pressure brake, the combination with a primary brake cylinder, an auxiliary brake cylinder, and valve means operative to supply fluid under pressure to said primary brake cylinder, speed controlled means for varying the pressure in a chamber according to the speed of the vehicle, and means operative upon supplying fluid under pressure to said primary brake cylinder to establish communication from said auxiliary brake cylinder to said chamber whereby fluid at the pressure in said chamber is supplied to said auxiliary brake cylinder, said means being operative upon a reduction in pressure in said primary brake cylinder to close said communication and vent fluid under pressure from said auxiliary brake cylinder.

6. In a fluid pressure brake, the combination with a primary brake cylinder, an auxiliary brake cylinder, and valve means operative to supply fluid under pressure to said primary brake cylinder, of means controlled by the opposing pressures of said brake cylinders, and operative upon an increase in pressure in said primary brake cylinder to open a communication through which fluid under pressure is adapted to be supplied to said auxiliary brake cylinder and operative upon substantial equalization of pressures in said cylinders to close said communication, and speed responsive means for controlling the supply of fluid under pressure to said communication and operative to vary the pressure of fluid thus supplied in accordance with the speed of the vehicle.

7. In a fluid pressure brake, the combination with a primary brake cylinder and an auxiliary brake cylinder, of valve means operative to supply fluid under pressure to said primary brake cylinder, speed responsive means for supplying fluid to said auxiliary brake cylinder at a pressure corresponding to the speed of the vehicle and operative upon an increase in vehicle speed to increase the pressure of such supply and upon a reduction in vehicle speed to reduce the pressure of such supply, and means controlled by the opposing pressures of said brake cylinders for controlling the communication through which fluid under pressure, supplied by said speed responsive means, is adapted to flow to said auxiliary brake cylinder and operative when the pressure in said primary brake cylinder exceeds that in said auxiliary brake cylinder to open said communication, and when lower than that in said auxiliary brake cylinder to close said communication and vent fluid under pressure from said auxiliary brake cylinder, and when the pressure in both cylinders is substantially equal to close said communication and thereby lap said auxiliary brake cylinder.

8. In a fluid pressure brake, the combination with a primary brake cylinder, an auxiliary brake cylinder, and valve means operative to supply fluid under pressure to and release fluid under pressure from said primary brake cylinder, of a speed governor operative according to the speed of the vehicle, valve means responsive to the operation of said speed governor to maintain a fluid pressure in a chamber which varies in degree in accordance with the speed of the vehicle, and valve means operated by fluid under pressure supplied to said primary brake cylinder to establish communication between said chamber and auxiliary brake cylinder whereby fluid at the pressure acting in said chamber is supplied to said auxiliary brake cylinder, said valve means being operative upon the release of fluid under pressure from said primary brake cylinder to cut off the supply of fluid under pressure to and vent fluid under pressure from said auxiliary brake cylinder.

9. In a fluid pressure brake, the combination with a primary brake cylinder, an auxiliary brake cylinder, and valve means operative to supply fluid under pressure to and release fluid under pressure from said primary brake cylinder, valve means controlled by the opposing pressures of fluid in said brake cylinders and operative upon an increase in pressure in said primary brake cylinder to supply fluid under pressure from a chamber to said auxiliary brake cylinder and operative upon substantial equalization of pressures in said brake cylinders to cut off the supply of fluid under pressure to said auxiliary brake cylinder and thereby lap said auxiliary brake cylinder, and means responsive to the speed of the vehicle for maintaining a fluid pressure in said chamber, the degree of which varies as the speed of the vehicle varies.

10. In a fluid pressure brake, the combination with a brake cylinder, and a source of fluid at a pressure which varies in accordance with the speed of the vehicle, a valve operative to supply fluid under pressure from said source to said brake cylinder, a movable abutment subject to the opposing pressures of a chamber and said brake cylinder and operative upon an increase in pressure in said chamber to effect the operation of said valve, and manually controlled means for supplying fluid under pressure to said chamber.

11. In a fluid pressure brake, the combination with a brake cylinder, and a source of fluid at a pressure which varies in accordance with the speed of the vehicle, a valve operative to supply fluid under pressure from said source to said brake cylinder, a movable abutment subject to the opposing pressures of a chamber and said brake cylinder and operative when the pressure in said chamber exceeds that in said brake cylinder to effect the operation of said valve to supply fluid under pressure to said brake cylinder and when the pressure in said chamber is lower than that in said brake cylinder to render said valve ineffective to supply fluid under pressure to said brake cylinder, and manually controlled means for varying the pressure of fluid in said chamber.

12. In a fluid pressure brake, the combination with a brake cylinder, and a source of fluid at a pressure which varies in accordance with the speed of the vehicle, a valve operative to supply fluid under pressure from said source to said brake cylinder, a movable abutment subject to the opposing pressures of a chamber and said brake cylinder and operative when the pressure in said chamber exceeds that in said brake cylinder to effect the operation of said valve to supply fluid under pressure to said brake cylinder and when the pressure in said chamber is lower than that in said brake cylinder to render said valve ineffective to supply fluid under pressure to said brake cylinder, and to vent fluid under pressure from said brake cylinder, and when the pressures in said chamber and brake cylinder are substantially equal to render said valve ineffective to supply fluid under pressure to said brake cylinder and to lap said brake cylinder, and manually controlled means for varying the pressure of fluid in said chamber.

THEOPHILE TARISIEN.